US009730234B2

(12) United States Patent
Mitra et al.

(10) Patent No.: US 9,730,234 B2
(45) Date of Patent: Aug. 8, 2017

(54) CHANNEL SELECTION AT SMALL CELL ACCESS POINTS BASED ON DETECTION OF HIDDEN NODES

(71) Applicant: QUALCOMM Incorporated, San Diego, CA (US)

(72) Inventors: Suhas Mitra, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/793,564

(22) Filed: Jul. 7, 2015

(65) Prior Publication Data

US 2017/0013627 A1    Jan. 12, 2017

(51) Int. Cl.
| | |
|---|---|
| *H04L 12/26* | (2006.01) |
| *H04W 72/08* | (2009.01) |
| *H04W 8/00* | (2009.01) |
| *H04W 16/14* | (2009.01) |

(52) U.S. Cl.
CPC ......... *H04W 72/082* (2013.01); *H04W 8/005* (2013.01); *H04W 16/14* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 7,184,407 B1* | 2/2007 | Myles | ................... | H04W 16/14 370/242 |
| 2003/0158922 A1* | 8/2003 | Park | ..................... | H04W 48/16 709/222 |
| 2007/0195812 A1* | 8/2007 | Lee | ...................... | H04L 12/413 370/445 |
| 2008/0144500 A1* | 6/2008 | Chen | ................. | H04W 74/0816 370/235 |

(Continued)

FOREIGN PATENT DOCUMENTS

| | | |
|---|---|---|
| WO | 03088587 A1 | 10/2003 |
| WO | 2009050628 A1 | 4/2009 |
| WO | 2011116240 A1 | 9/2011 |
| WO | 2013149387 A1 | 10/2013 |
| WO | 2013167748 A1 | 11/2013 |

OTHER PUBLICATIONS

International Search Report and Written Opinion—PCT/US2016/040768—ISA/EPO—Sep. 28, 2016.

(Continued)

*Primary Examiner* — Otis L Thompson, Jr.
(74) *Attorney, Agent, or Firm* — Muncy, Geissler, Olds & Lowe, P.C.

(57) ABSTRACT

Techniques for managing communications are disclosed. The management may comprise, for example, monitoring a shared channel for downlink transmissions associated with a first Radio Access Technologies (RAT) and uplink transmissions associated with the first RAT, identifying a first set of node identifiers associated with the downlink transmissions on the shared channel and a second set of node identifiers associated with the uplink transmissions on the shared channel, and detecting a hidden node operating on the shared channel based on the first set of node identifiers and the second set of node identifiers.

32 Claims, 6 Drawing Sheets

(56) References Cited

U.S. PATENT DOCUMENTS

| | | | |
|---|---|---|---|
| 2009/0040937 A1 | 2/2009 | Xhafa et al. | |
| 2010/0226344 A1* | 9/2010 | Nandagopalan | H04W 36/385 370/338 |
| 2012/0002567 A1 | 1/2012 | Sun et al. | |
| 2013/0201884 A1 | 8/2013 | Freda et al. | |
| 2014/0185497 A1 | 7/2014 | Wolf et al. | |
| 2014/0355576 A1* | 12/2014 | Wang | H04W 48/12 370/336 |
| 2015/0063151 A1 | 3/2015 | Sadek et al. | |
| 2015/0365841 A1* | 12/2015 | Wilhelmsson | H04W 36/30 370/252 |
| 2016/0066195 A1* | 3/2016 | Moon | H04W 16/14 455/454 |
| 2016/0066204 A1* | 3/2016 | Khawer | H04W 72/085 455/500 |
| 2016/0081106 A1* | 3/2016 | Zhou | H04W 24/10 370/328 |
| 2016/0088618 A1* | 3/2016 | Barriac | H04W 74/0816 370/329 |
| 2016/0330757 A1* | 11/2016 | Cherian | H04W 72/1268 |
| 2016/0344670 A1* | 11/2016 | Wu | H04L 12/6418 |

OTHER PUBLICATIONS

LG Electronics Inc: "Further Analysis on Hidden Node Detection Based no RSSI Report," 3GPP Draft; R2-152776 Further Analysis on Hidden Node Detection Based No RSSI Report, 3rd Generation Partnership Project (3GPP), Mobile Competence Centre ; 650, Route Des Lucioles ; F-06921 Sophia-Ant vol. RAN WG2, no. Fukuoka, Japan; May 25, 2015-May 29, 2015 May 22, 2015 (May 22, 2015), XP050977745, Retrieved from the Internet: URL:http://www.3gpp.org/ftp/tsg ran/WG2 RL 2/TSGR2 90/Docs/—[retrieved on May 22, 2015].

"Status Report to TSG 1 Work Plan Related Evaluation," 3GPP Draft; RP-150624, 3rd Generation Partnership Project (3GPP), Mobile Competence Centre ; 650, Route Des Lucioles ; F-06921 Sophia-Antipolis Cedex ; France vol. TSG RAN, no. Malmo; Jun. 15, 2015-Jun. 18, 2015 Jun. 15, 2015 (Jun. 15, 2015), XP050984237, Retrieved from the Internet: URL:http://www.3gpp.org/ftp/Meetings_3GPP_SYNC/RAN/Docs/—[retrieved on Jun. 15, 2015].

* cited by examiner

CHANNEL SELECTION AT SMALL CELL ACCESS POINTS BASED ON DETECTION OF HIDDEN NODES

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency band such as the Unlicensed National Information Infrastructure (U-NII) band used by Wireless Local Area Network (WLAN) technologies. This extension of small cell LTE operations is designed to increase spectral efficiency and hence capacity of the LTE system. However, it may also interfere with the operations of other Radio Access Technologies (RATs) that typically utilize the same unlicensed bands, most notably IEEE 802.11x WLAN technologies (generally referred to as "WiFi"). As a result, small cell access points need to be designed such that they employ the secondary RAT on shared channels in a way that limits interference with pre-existing first-RAT operations. A particular problem arises when the small cell access points can not directly detect the nodes with which they will potentially interfere.

SUMMARY

The accompanying drawings are presented to aid in the description of various aspects of the disclosure and are provided solely for illustration of the aspects and not limitation thereof.

In one example, a communications apparatus is disclosed. The communications apparatus may include, for example, a transceiver configured to monitor a shared channel for downlink transmissions associated with a first Radio Access Technology (RAT) and uplink transmissions associated with the first RAT; a processor configured to identify a first set of node identifiers (NIDs) associated with the downlink transmissions on the shared channel and a second set of NIDs associated with the uplink transmissions on the shared channel and detect a hidden node operating on the shared channel based on the first set of NIDs and the second set of NIDs; and memory coupled to the processor and configured to store data, instructions, or a combination thereof.

In another example, a communications method is disclosed. The communications method may include, for example, monitoring a shared channel for downlink transmissions associated with a first RAT and uplink transmissions associated with the first RAT, identifying a first set of NIDs associated with the downlink transmissions on the shared channel and a second set of NIDs associated with the uplink transmissions on the shared channel, and detecting a hidden node operating on the shared channel based on the first set of NIDs and the second set of NIDs.

In another example, another communications apparatus is disclosed. The communications apparatus may include, for example, means for monitoring a shared channel for downlink transmissions associated with a first RAT and uplink transmissions associated with the first RAT, means for identifying a first set of NIDs associated with the downlink transmissions on the shared channel and a second set of NIDs associated with the uplink transmissions on the shared channel, and means for detecting a hidden node operating on the shared channel based on the first set of NIDs and the second set of NIDs.

In another example, a computer-readable medium comprising at least one instruction for causing a processor to perform processes is disclosed. The computer-readable medium may include, for example, code for monitoring a shared channel for downlink transmissions associated with a first RAT and uplink transmissions associated with the first RAT, code for identifying a first set of NIDs associated with the downlink transmissions on the shared channel and a second set of NIDs associated with the uplink transmissions on the shared channel, and code for detecting a hidden node operating on the shared channel based on the first set of NIDs and the second set of NIDs is disclosed.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
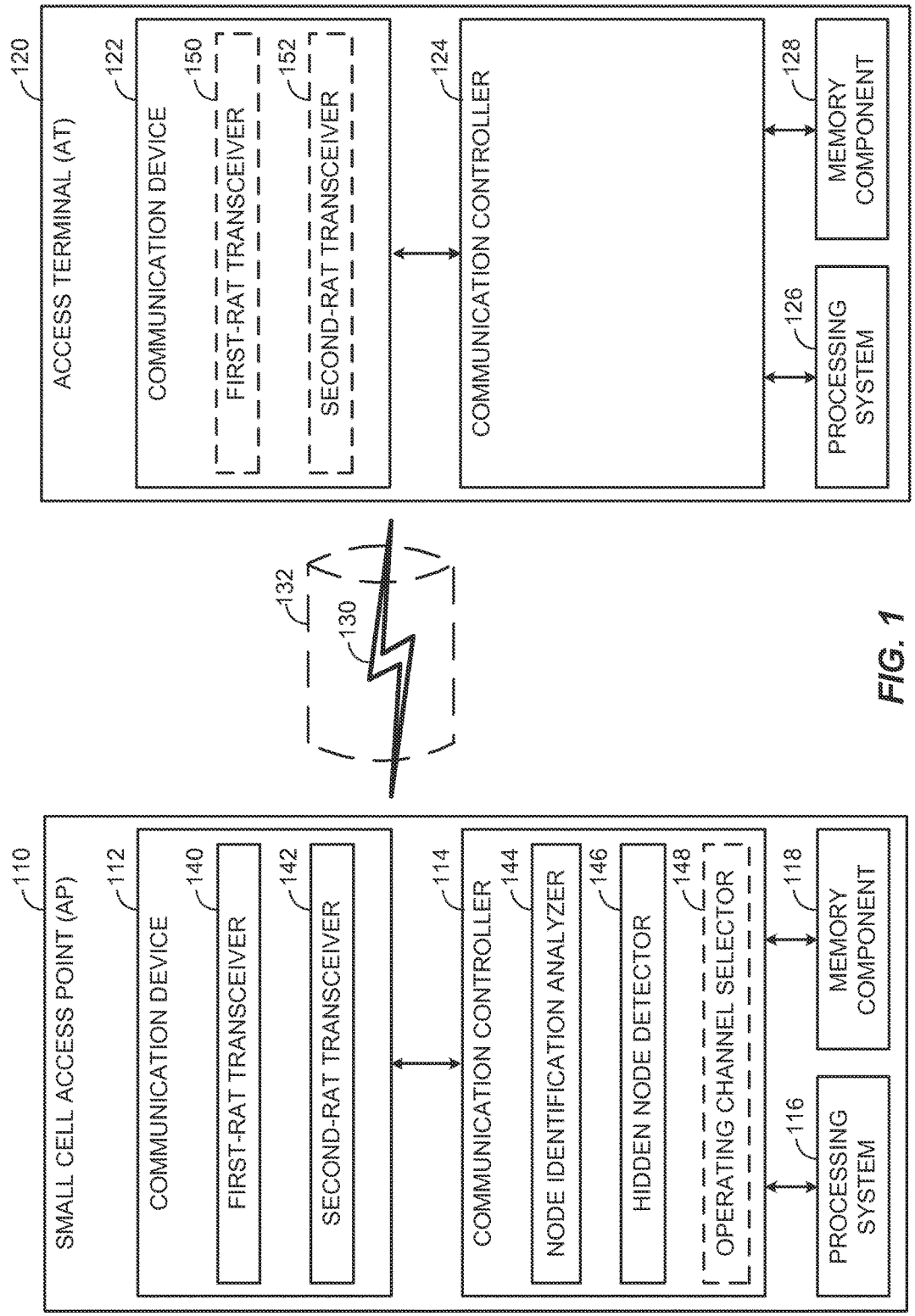
FIG. 1 illustrates an example wireless communication system including a Small Cell Access Point (AP) in communication with an Access Terminal (AT).

The present disclosure relates generally to a channel selection scheme that is based on the detection of hidden nodes. In order to detect hidden nodes, an access point may first identify un-hidden nodes (referred to herein as neighbor nodes) that are operating in accordance with a first RAT (for example, WiFi). The access point identifies these neighbor nodes by monitoring the channels upon which neighbor nodes are operating (in the case of WiFi, channels within the U-NII band). When the access point detects a downlink transmission from the neighbor node (for example, a beacon signal), the access point can identify the node that transmitted the downlink transmission and the channel upon which the node is operating.

As used herein, "operations" on a particular channel may include one or more of performing transmissions on the particular channel, receiving transmissions on the particular channel, measuring transmissions on the particular channel, etc. Moreover, "operations" in accordance with a particular RAT may refer to operations that conform, in full or in part, to one or more aspects of a particular standard, or usage of a channel or transceiver that is associated with a particular standard. As used herein, a "downlink transmission" may refer to any transmission from an access point intended for an access terminal, and an "uplink transmission" may refer to any transmission from an access terminal intended for an access point.

As noted above, the access point may be configured to employ a second RAT within the same set of channels as the first RAT (for example, the access point can employ both LTE and WiFi within the U-NII band). In order to increase spectral efficiency, the access point will employ the second RAT in channels that are not already being used for first-RAT operations in the surrounding wireless environment. In one possible scenario, the access point would be able to determine which of the channels are available simply by checking for downlink transmissions from neighboring nodes, as set forth above. The access point would then prevent these channels from being selected for second-RAT operations. However, the downlink transmissions of nearby neighbor nodes may not be sufficient.

In one possible scenario, a hidden node is communicating with an intermediate node that is positioned partway between the access point and the hidden node. The hidden node may be far enough away from the access point that the access point cannot detect the hidden node's downlink transmissions. Even so, the intermediate node may be close enough that the access point is capable of interfering with communications between the intermediate node and the hidden node. In accordance with the present disclosure, the access point can monitor the uplink transmissions transmitted by the intermediate node and thereby identify the hidden node. As a result, the access point can perform channel selection for second-RAT operations such that interference with the first-RAT operations of the hidden node and/or the intermediate node can be reduced.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example wireless communication system including a Small Cell Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. "Small cells" generally refer to a class of low-powered access points that may include or be otherwise referred to as femto cells, pico cells, micro cells, WiFi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128 coupled to the processing systems 116 and 126, respectively, and configured to store data, instructions, or a combination thereof).

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

The access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points as in the system of FIG. 1, have extended operation into unlicensed frequency bands such as the Unlicensed National Information Infrastructure (U-NII) band used by Wireless Local Area Network (WLAN) technologies, most notably IEEE 802.11x WLAN technologies (generally referred to as "WiFi").

In the example of FIG. 1, the communication device 112 of the access point 110 includes two "co-located" transceivers operating according to respective RATs, including a "first-RAT" transceiver 140 and a "second-RAT" transceiver 142. As used herein, a transceiver may include a transmitter circuit, a receiver circuit, or a combination thereof, but need not provide both functionalities in all designs. For example, a low functionality receiver circuit may be employed in some designs to reduce costs when providing full communication is not necessary (e.g., a WiFi chip or similar circuitry simply providing low-level sniffing). Further, as used herein, the term co-located (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The first-RAT transceiver 140 and the second-RAT transceiver 142 may provide different functionalities and may be used for different purposes. As an example, the first-RAT transceiver 140 may operate in accordance with WiFi technology to provide communication with the access terminal 120 on the wireless link 130, while the second-RAT transceiver 142 may operate in accordance with Long-Term Evolution (LTE) technology to monitor LTE signaling on the medium 132 that may interfere with or be interfered with by the WiFi communications. Further, the communication device 122 of the access terminal 120 is shown in FIG. 1 as including a similar first-RAT transceiver 150 and a similar second-RAT transceiver 152 for illustration purposes, although it may not be necessary for both the access point 110 and the access terminal 120 to be multi-RAT capable in all designs.

As will be discussed in more detail below with reference to FIGS. 2-6, the communication controller 114 of the access point 110 may include a node identification analyzer 144, a hidden node detector 146, and an operating channel selector 148. The communication controller 114 may operate in conjunction with the first-RAT transceiver 140 and the second-RAT transceiver 142 to manage operation on the medium 132.

Figure 2:
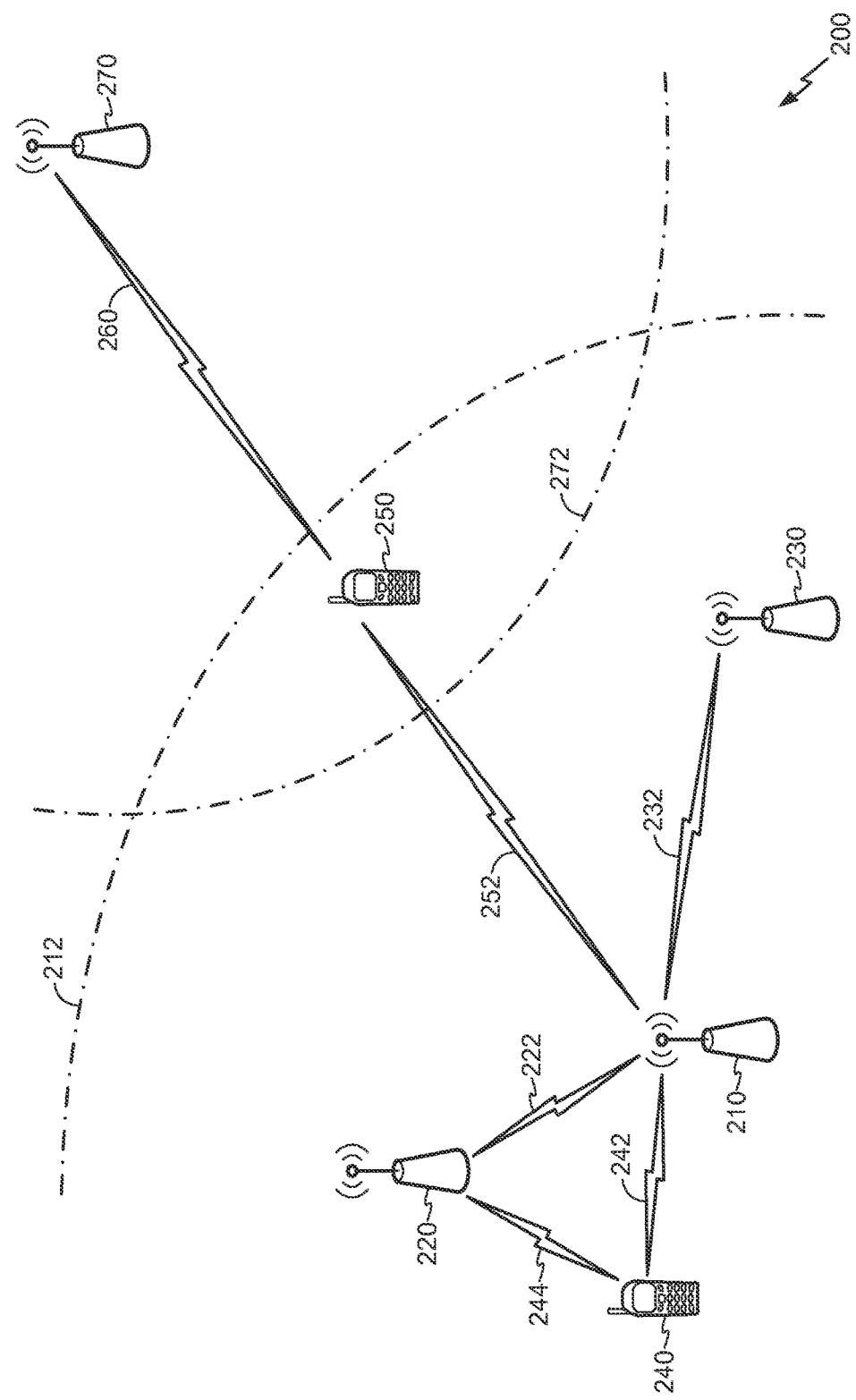
FIG. 2 illustrates an example of a wireless environment including an access point, neighbor nodes, and a hidden node.

FIG. 2 illustrates an example of a wireless environment 200 including an access point 210. The access point 210 may be analogous to, for example, the access point 110 of FIG. 1. The wireless environment 200 further includes a first neighbor node 220 and a second neighbor node 230. The first neighbor node 220 and the second neighbor node 230 may be analogous to, for example, the access point 110 or the access terminal 120 of FIG. 1.

The first neighbor node 220 and the second neighbor node 230 are both within a range 212 of the access point 210. In the present illustration, the range 212 of the access point 210 is defined as an area in which the access point 210 can directly monitor transmissions. For example, suppose that the first neighbor node 220 transmits a downlink transmission on a first selected channel and the second neighbor node 230 transmits a downlink transmission on a second selected channel. If the access point 210 is monitoring the first selected channel and the second selected channel, then the access point 210 will detect the downlink transmissions on link 222 and link 232, respectively.

The wireless environment 200 also includes an access terminal node 240. The access terminal node 240 may be analogous to, for example, the access terminal 120 of FIG. 1. As shown in FIG. 2, both the access terminal node 240 and the first neighbor node 220 are within the range 212 of the access point 210. As a result, transmissions from the access point 210 can potentially interfere with communications between the access terminal node 240 and the first neighbor node 220.

The wireless environment 200 further includes an intermediate node 250. The intermediate node 250 may be analogous to, for example, the access point 110 or the access terminal 120 of FIG. 1; however, in FIG. 2, the intermediate node 250 is depicted as an access terminal.

As illustrated in FIG. 2, the intermediate node 250 is within the range 212 of the access point 210. As a result, transmissions sent by the access point 210 will be detected by the intermediate node 250 on link 252, and vice-versa. The intermediate node 250 is also within a range 272 of a hidden node 270. As a result, transmissions sent by the hidden node 270 will be detected by the intermediate node 250 on link 260, and vice-versa. The hidden node 270 may be analogous to, for example, the access point 110 or the access terminal 120 of FIG. 1; however, in FIG. 2, the hidden node 270 is depicted as an access point.

The hidden node 270 is "hidden" from the access point 210 in the sense that transmissions from the hidden node 270 will not extend beyond the range 272 of the hidden node 270 and therefore will not be detected by the access point 210. However, the intermediate node 250 is within the range 272 of the hidden node 270 as well as the range 212 of the access point 210. As a result, transmissions from the access point 210 can potentially interfere with communications between the intermediate node 250 and the hidden node 270. As will be discussed in greater detail in the present disclosure, the access point 210 can monitor the signals sent by the intermediate node 250 to detect the hidden node 270 and perform improved channel selection.

Figure 3:
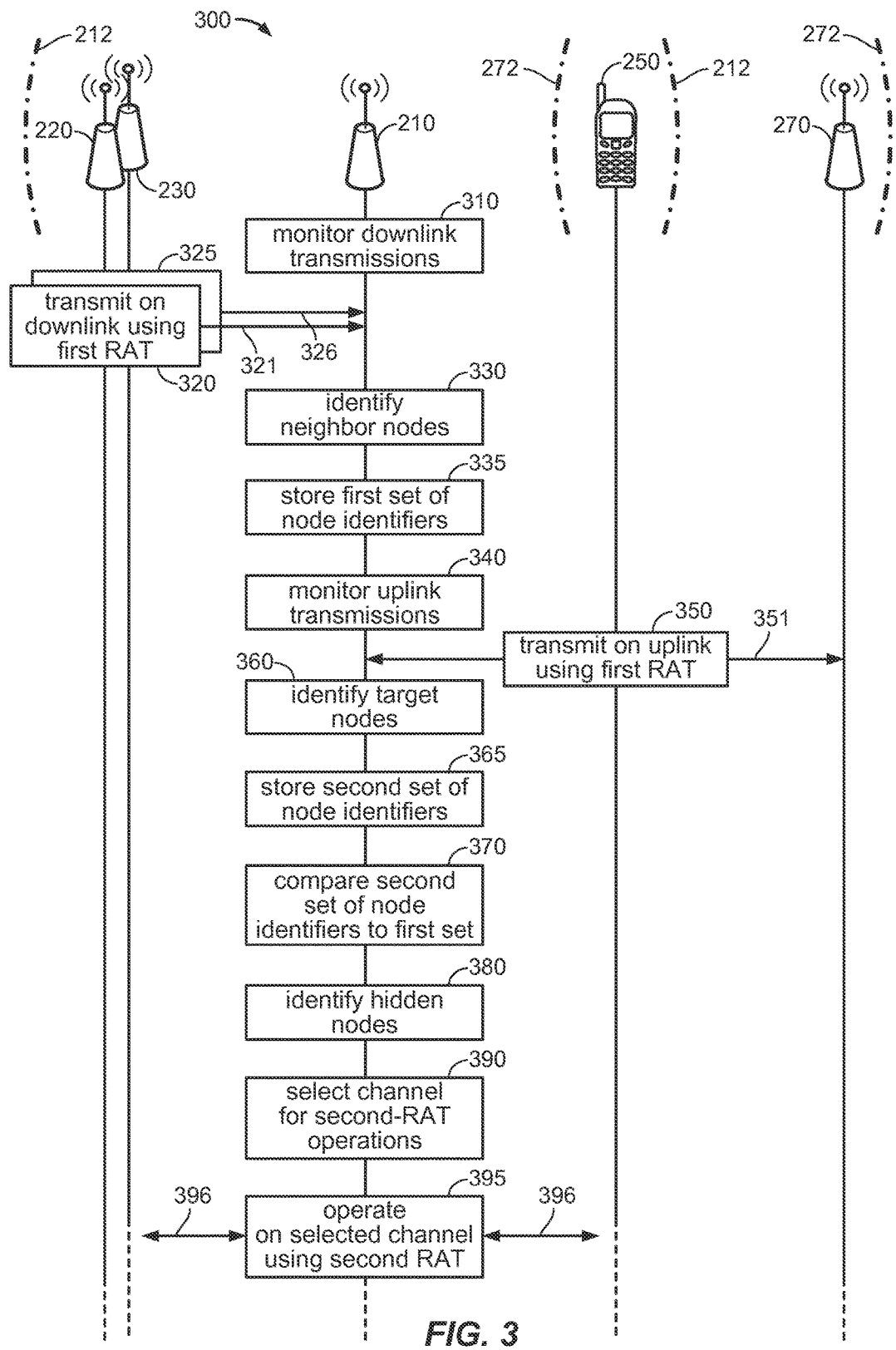
FIG. 3 illustrates an example of a signal flow diagram for performing channel selection at a small cell access point based on detection of a hidden node.

FIG. 3 illustrates an example of a signal flow diagram 300 for performing channel selection at a small cell access point based on detection of a hidden node. In order to illustrate channel selection in accordance with the present disclosure, FIG. 3 depicts signal flows between the access point 210, first neighbor node 220, second neighbor node 230, intermediate node 250, and hidden node 270 of FIG. 2. As noted above, the access point 210 can increase spectral efficiency in the surrounding wireless environment by selecting an operating channel for second-RAT operations that is not already being used by surrounding nodes for first-RAT operations.

The access point 210 may begin by monitoring downlink transmissions (block 310). The monitoring can be performed using any appropriate transceiver. For example, the access point 110 depicted in FIG. 1 can use the first-RAT transceiver 140 included in the communication device 112 to detect downlink transmissions in the surrounding wireless environment. Any downlink transmission within the range 212 of the access point 210 can be detected in the same manner.

As in FIG. 2, both the first neighbor node 220 and the second neighbor node 230 are within the range 212 of the access point 210. Accordingly, when the first neighbor node 220 transmits on the downlink using the first RAT (block 320), the resulting downlink transmission 321 is detected by the access point 210. Moreover, when the second neighbor node 230 transmits on the downlink using the first RAT (block 325), the resulting downlink transmission 326 is also detected by the access point 210. Although the signal flow diagram 300 shows two neighbor nodes, it will be understood that there may be any number of neighbor nodes within the range 212 of the access point 210 (including zero). It will also be understood that the downlink transmission 321 and the downlink transmission 326 need not be intended for the access point 210. Instead, the downlink transmission 321 and the downlink transmission 326 may be intended for reception by some other node in the area, for example, the access terminal node 240 of FIG. 2 (not shown in FIG. 3). Regardless of their intended recipient, the downlink transmission 321 and the downlink transmission 326 will nevertheless be detected by the access point 210.

Next, the access point 210 can identify the neighbor nodes within the range 212 (block 330) based on the detected downlink transmission 321 and the detected downlink transmission 326. In one possible scenario, a downlink packet associated with the downlink transmission 321 or the downlink transmission 326 may include a node identifier (NID) that identifies the node that transmitted the downlink packet. For example, the downlink packet may be a beacon signal.

The access point 210 then stores a first set of NIDs (block 335) that includes the NID of every neighbor node from which a downlink transmission is detected. It will be understood that the first set of NIDs may include any number of NIDs (including zero). The first set of NIDs may be stored in, for example, a NID database that is maintained at the access point 210. In the access point 110 of FIG. 1, for example, the NID database may be stored in the memory component 118. The access point 210 may perform the storage at block 335 in the same manner. In order to maintain the NID database, the access point 210 may periodically update the NID database. For example, if the access point 210 detects a downlink transmission associated with a particular NID, then the access point 210 may determine whether the particular NID is already stored in the first set. If it is not, then the particular NID may be added to the first set. Alternatively, if a particular NID that is already stored in the first set of NIDs is not associated with a recently-detected downlink transmission, then that particular NID may be removed from the first set. In addition to the NIDs themselves, the NID database may also store the channel associated with each NID, i.e., the channel that was being monitored when the downlink transmission associated with the NID was detected.

A WiFi "sniff" is one exemplary illustration of blocks 310, 320, 325, and 330. In a WiFi sniff, the access point 210 uses a WiFi transceiver (for example, the first-RAT transceiver 140 in FIG. 1) to monitor for downlink transmissions in the surrounding wireless network. In this illustration, the first neighbor node 220 is a WiFi router that transmits a WiFi beacon signal on a particular WiFi channel in the U-NII band. The beacon signal includes a basic service set identifier (BSSID) that is unique to the first neighbor node 220. If the access point 210 is monitoring the particular WiFi channel on which the beacon signal is transmitted, then the access point 210 will be able to identify the first neighbor node 220 based on the beacon signal's BSSID.

Additionally or alternatively, the beacon signal includes the media access control address (MAC address) of the first neighbor node 220. It will be understood that in some implementations, the BSSID and MAC address of the first neighbor node 220 are, by design, identical. Accordingly, the BSSID of the first neighbor node 220 is the MAC address of the first neighbor node 220, and vice-versa.

In this exemplary illustration, the first set of NIDs stored by the access point 210 (block 335, as noted above) will be updated to include the BSSID (or MAC address) of the first neighbor node 220. The WiFi sniff may be repeated intermittently or periodically, and the first set of NIDs stored in the NID database may be updated after each WiFi sniff. In addition to the BSSID (or MAC address) of the first neighbor node 220, the NID database may also store the channel on which the BSSID (or MAC address) was detected.

Returning to FIG. 3, the access point 210 now begins to monitor uplink transmissions (block 340). The monitoring can be performed using any appropriate transceiver. For example, the access point 110 depicted in FIG. 1 can use the first-RAT transceiver 140 included in the communication device 112 to detect uplink transmissions in the surrounding wireless environment. The access point 210 may monitor uplink transmissions in the same manner. Accordingly, any uplink transmission within the range 212 of the access point 210 will be detected by the access point 210. Moreover, the uplink transmissions will identify a target node that is the intended recipient of the uplink transmission. As will be described below, the target node may be within the range 212 of the access point 210 (like first neighbor node 220 and second neighbor node 230), but may also be outside of the range 212 (like hidden node 270).

In the signal flow diagram 300 of FIG. 3, an uplink transmission 351 is transmitted by the intermediate node 250 (at block 350). As will be understood from FIG. 2, the intermediate node 250 is within the range 272 of the hidden node 270. Moreover, in this illustration, the uplink transmission 351 is intended for reception by the hidden node 270. As a result, the uplink packet or packets used for uplink transmission 351 include the NID of the hidden node 270. When the hidden node 270 receives the uplink transmission 351, it is able to recognize its own NID in the uplink transmission 351 and correctly identify itself as the intended recipient of the uplink transmission 351. In one exemplary illustration, the uplink transmission 351 comprises a clear-to-send message (CTS) that identifies the hidden node 270 and notifies it that the intermediate node 250 is prepared to receive a downlink transmission. In another exemplary illustration, the uplink transmission 351 comprises an acknowledgement message (ACK) that identifies the hidden node 270 and notifies it that a downlink transmission has been received.

As in FIG. 2, the intermediate node 250 is not only within the range 272 of the hidden node 270, but also within the range 212 of the access point 210. Accordingly, when the intermediate node 250 signals the hidden node 270 on the uplink using the first RAT (block 350, as noted above), the uplink transmission 351 is also detected by the access point 210. As noted above, the uplink packet or packets used for the uplink transmission 351 include the NID of the hidden node 270.

Based on the detected uplink transmission 351, the access point 210 can identify target nodes (block 360). As noted above, the target node that is identified in the present illustration is the hidden node 270, which is outside the range 212 of the access point 210. Because the uplink transmission 351 includes a NID associated with the target node, the target node can be identified by the access point 210, even if the target node is outside the range 212 of the access point 210 (as is the case with hidden node 270).

It will be understood that although FIG. 2 and FIG. 3 depict one intermediate node 250, there may in fact be more than one. In some scenarios, multiple intermediate nodes may independently enable the detection of a single hidden node (by independently signaling the hidden node on the uplink). Additionally or alternatively, each of the multiple intermediate nodes may enable the detection of multiple different hidden nodes.

Returning to FIG. 3, the access point 210 then stores a second set of NIDs (block 365) that includes the NID of every target node for which a detected uplink transmission is intended. It will be understood that the second set of NIDs may include any number of NIDs (including zero). Like the first set of NIDs, the second set of NIDs may be stored in a NID database that is maintained at the access point 210. As noted above, the access point 210 may periodically update the NID database. The second set of NIDs may be maintained and updated in the same manner as the first set of NIDs. In addition to the NIDs themselves, the NID database may also store the channel associated with each NID.

As noted above, blocks 310 through 335 describe a process for identifying neighbor nodes based on monitored downlink transmissions and storing a first set of NIDs associated with the neighbor nodes. Alternatively, blocks 340 through 365 describe a process for identifying hidden nodes based on monitored uplink transmissions and storing a second set of NIDs associated with target nodes (including hidden nodes). It will be understood, however, that the order of these processes may be reversed such that target nodes are identified first, followed by the neighbor nodes. Additionally or alternatively, the process for identifying neighbor nodes and the process for identifying hidden nodes may each be repeated continually and/or performed concurrently. For example, the access point 210 may continually monitor both uplinks and downlinks, and continually update the NID database as needed.

Returning to FIG. 3, after storing the second set of NIDs, the access point 210 compares the second set of NIDs to the first set of NIDs (block 370). As noted above, the first set of NIDs identifies neighbor nodes that are within the range 212 of the access point 210. Moreover, the second set of NIDs identifies the target nodes of uplink transmissions that are transmitted from within the range 212 of the access point 210. It will be understood that there may be significant overlap between the NIDs in the first set and the NIDs in the second set, because many of the neighbor nodes within the range 212 (having NIDs that are included in the first set) will also be identified as target nodes in uplink transmissions sent from within the range 212 (and thus included in the second set).

Based on the comparison (block 370, as noted above), the access point 210 identifies the hidden node 270 (block 380). In particular, the access point 210 determines whether the second set of NIDs (associated with the target nodes) includes at least one NID that is not included in the first set of NIDs (associated with neighbor nodes). Any NID that fits this description can be identified as a hidden node. In the present illustration, the hidden node 270 is close enough to be included in the second set of NIDs by virtue of the fact that it is targeted for uplink transmissions by an intermediate node 250 within the range 212 of the access point 210. However, the hidden node 270 is not close enough to be included in the first set of NIDs because its downlink transmissions are not directly detectable by the access point 210.

The access point 210 can then select a channel for second-RAT operations in a manner that increases spectral efficiency (block 390). For example, the access point 210 may assign a priority metric to each of the channels available for second-RAT operations and select the channel with the highest priority.

In one possible implementation, the channel with the highest priority is an "unused" channel. The set of unused channels includes channels that are not associated with a NID from either the first set of NIDs or the second set of NIDs (i.e., those that are being employed by a neighbor node for first-RAT operations within the range 212 and those that are being employed by an intermediate node within the range 212 for first-RAT communications with a target node). In this implementation, the unused channels are assigned a first priority for selection because second-RAT operations on these unused channels are unlikely to interfere with first-RAT operations of neighbor nodes and are also unlikely to interfere with first-RAT operations of intermediate nodes. The remaining channels (i.e., any channel associated with a NID in the first set or second set) are assigned a second priority. Table 1 shows an example of the priorities assigned to each channel in accordance with this implementation.

TABLE 1 first example of priority metrics for channel selection

| PRIORITY | CHANNELS |
| --- | --- |
| 1st | Unused channels |
| 2nd | Channels associated with target nodes and/or neighbor nodes |

In another implementation, the access point 210 further discriminates between channels associated with first-RAT operations of neighbor nodes (i.e., channels associated with NIDs in the first set) relative to channels associated with first-RAT operations of intermediate nodes (i.e., channels associated with NIDs in the second set). Unused channels still have first priority for selection. But only the channels associated with hidden nodes (i.e., channels associated with NIDs that are exclusive to the second set) are assigned second priority for selection, while channels associated with neighbor nodes (i.e. channels associated with NIDs in the first set) are assigned third priority for selection. Table 2 shows an example of the priorities assigned to each channel in accordance with this implementation.

TABLE 2 second example of priority metrics for channel selection

| PRIORITY | CHANNELS |
|---|---|
| 1st | Unused channels |
| 2nd | Channels associated with target nodes |
| 3rd | Channels associated with neighbor nodes |

In yet another implementation, the access point 210 further discriminates among channels associated with hidden nodes based on a received signal strength. In this implementation, during monitoring of uplink transmission (block 340, as noted above), the access point 210 measures a received signal strength of the uplink transmission 351 to generate a received signal strength indicator (RSSI). At block 365, the access point 210 may store the RSSI values in the NID database along with the NID of the target node and the channel of the uplink transmission 351. If there are multiple channels associated with hidden nodes, then those that are associated with low-RSSI uplink transmissions may be given higher priority for selection relative to those with high-RSSI uplink transmissions. In this implementation, unused channels will still have first priority for selection. But a channel associated with low-RSSI uplink transmissions to hidden nodes will be assigned second priority and a channel associated with high-RSSI uplink transmissions to hidden nodes will be assigned third priority. Channels associated with neighbor nodes will still be assigned the lowest priority metric for selection (in this implementation, fourth priority). Table 3 shows an example of the priorities assigned to each channel in accordance with this implementation.

TABLE 3 third example of priority metrics for channel selection

| PRIORITY | CHANNELS |
|---|---|
| 1st | Unused channels |
| 2nd | Channels associated with low-RSSI uplink transmissions to target nodes |
| 3rd | Channels associated with high-RSSI uplink transmissions to target nodes |
| 4th | Channels associated with neighbor nodes |

In the third example shown in Table 3, the access point 210 distinguishes low-RSSI uplink transmissions from high-RSSI uplink transmissions by simple comparison to an arbitrarily-assigned RSSI threshold value. If the measured RSSI value is below the RSSI threshold value, then the associated uplink transmission is categorized as "low-RSSI", and if the measured RSSI value is above the RSSI threshold, then the associated uplink transmission is categorized as "high-RSSI". However, it will be understood that in other implementations, there can be any number of distinct RSSI threshold values. For example, by defining two distinct RSSI threshold values uplink transmissions can be divided into three categories, by defining three distinct RSSI threshold value uplink transmissions can be divided into four categories, etc. In each case the uplink transmissions associated with the lowest RSSI values are selected with the highest priority.

It will also be understood that the priority metric scheme outlined above can either stand alone as the sole method for channel selection, or be used to augment some other scheme. In the latter case, the priority metrics outlined above would be weighted factors for channel selection in a greater channel selection scheme.

Returning to FIG. 3, once a channel is selected, the access point 210 can commence operations on the selected channel using the second RAT (block 395). In particular, the access point 210 communicates with another device by sending or receiving a second-RAT transmission 396 on the selected channel. In one possible example, the access point 210 is analogous to the access point 110 of FIG. 1 and operates in the same manner. The first-RAT transceiver 140 may be a WiFi transceiver and the second-RAT transceiver 142 may be an LTE transceiver. The access point 210 considers the channels within the U-NII band to be "shared" channels by virtue of the fact that they can be used to employ WiFi or LTE. In blocks 310 through 380, the access point 210 acquires a complete picture of WiFi operations in the surrounding wireless environment. At block 390, it assigns priority metrics to each of the shared channels in the U-NII band and selects the channel with the highest priority for selection. At block 395, it commences LTE operations on the selected channel, for example, by sending or receiving LTE signals on the selected channel.

Figure 4:
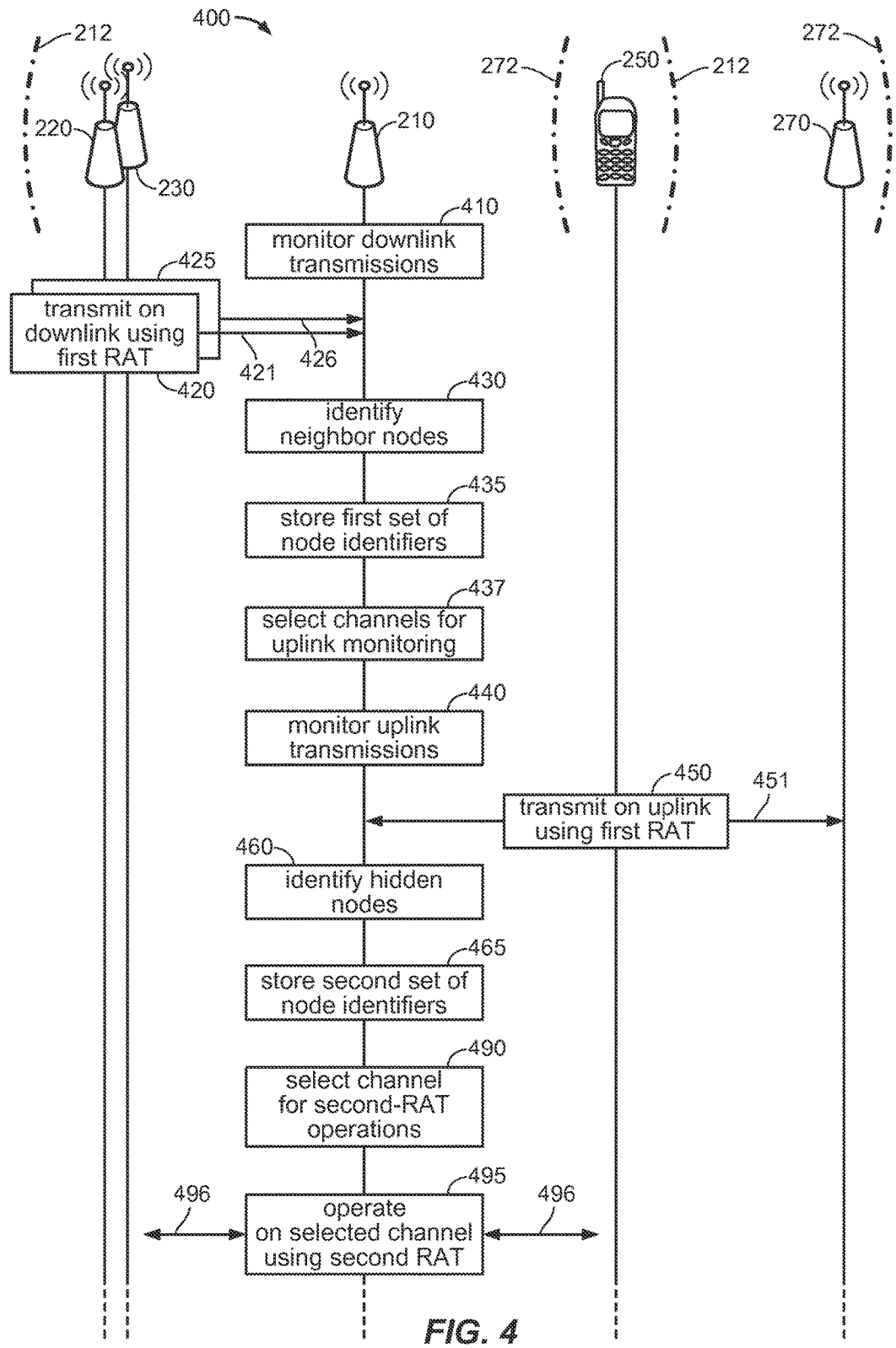
FIG. 4 illustrates another example of a signal flow diagram for performing channel selection at a small cell access point based on detection of a hidden node.

FIG. 4 illustrates another example of a signal flow diagram 400 for performing channel selection at a small cell access point based on detection of a hidden node. Similar to FIG. 3, FIG. 4 depicts signal flows between the access point 210, first neighbor node 220, second neighbor node 230, intermediate node 250, and hidden node 270 of FIG. 2.

Blocks 410 through 435 of FIG. 4 are analogous to blocks 310 through 335 of FIG. 3. First, the access point 210 monitors downlink transmissions from neighbor nodes (at block 410). The access point 210 identifies the first neighbor node 220 and second neighbor node 230 (at block 430) on the basis of downlink transmission 421 and downlink transmission 426 (transmitted at blocks 420 and 425, respectively). Then the access point 210 stores the NIDs associated with the downlink transmission 421 and downlink transmission 426 in a first set of NIDs (block 435). The first set of NIDs may be stored in a NID database.

The signal flow diagram 400 differs from the signal flow diagram 300 in that the access point 210 monitors uplink transmissions on a subset of shared channels, rather than all of the shared channels. In particular, the access point 210 selects a subset of channels for uplink monitoring (block 437) prior to monitoring uplink transmissions (block 440). In particular, the access point 210 performs uplink monitoring on all channels except those that are associated with downlink transmissions of neighbor nodes. In other words, the channels associated with NIDs in the first set of NIDs are not used for uplink monitoring at block 440.

Block 450 is analogous to block 350. The intermediate node 250 transmits on the uplink using the first RAT and the uplink transmission 451 is detected by the access point 210. In contrast to the uplink transmission 351 of FIG. 3, which identifies target nodes that are both inside the range 212 (i.e., neighbor nodes) and outside the range 212 (i.e., hidden nodes), the uplink transmission 451 will only identify the NIDs of hidden nodes. Because the access point 210 is not monitoring channels associated with neighbor nodes (block 440, as noted above), the target node indicated by uplink transmission 451 is likely to be a hidden node (such as hidden node 270).

Block 460 is analogous to block 360. At 460, the access point 210 can identify target nodes based on the detected uplink transmission 451. As noted above, the target node that is identified in the present illustration is the hidden node 270, which is outside the range 212 of the access point 210. Because the uplink transmission 451 includes a NID associated with the target node, the target node can be identified by the access point 210, even if the target node is outside the range 212 of the access point 210 (as is the case with hidden node 270).

Block 465 is analogous to block 365. In particular, the access point 210 stores a NID of the hidden node 270 in a second set of NIDs.

Blocks 490 through 495 of FIG. 4 are analogous to blocks 390 through 395 of FIG. 3. The channel selection performed by the access point 210 (block 490) may be based on any of the priority metrics set forth in the present disclosure. Consider the following adaptation of the implementation shown in Table 3 above. First, channels that are not associated with any NID in either of the first set (stored at block 435) or second set (stored at block 465) are assigned a first priority for selection. Channels that are associated with low-RSSI uplink transmissions to hidden nodes (i.e., channels associated with NIDs in the second set, but also having low RSSI measurements) are assigned a second priority for selection. Channels that are associated with high-RSSI uplink transmissions to hidden nodes (i.e., channels associated with NIDs in the second set, but also having high RSSI measurements) are assigned a third priority for selection. Channels that are associated with downlink transmissions from neighbor nodes (i.e., channels associated with NIDs in the first set) are assigned a fourth priority for selection.

Finally, the access point 210 operates on the selected channel using the second RAT (block 495). In particular, the access point 210 communicates with another device by sending or receiving a second-RAT transmission 496 on the selected channel.

Figure 5:
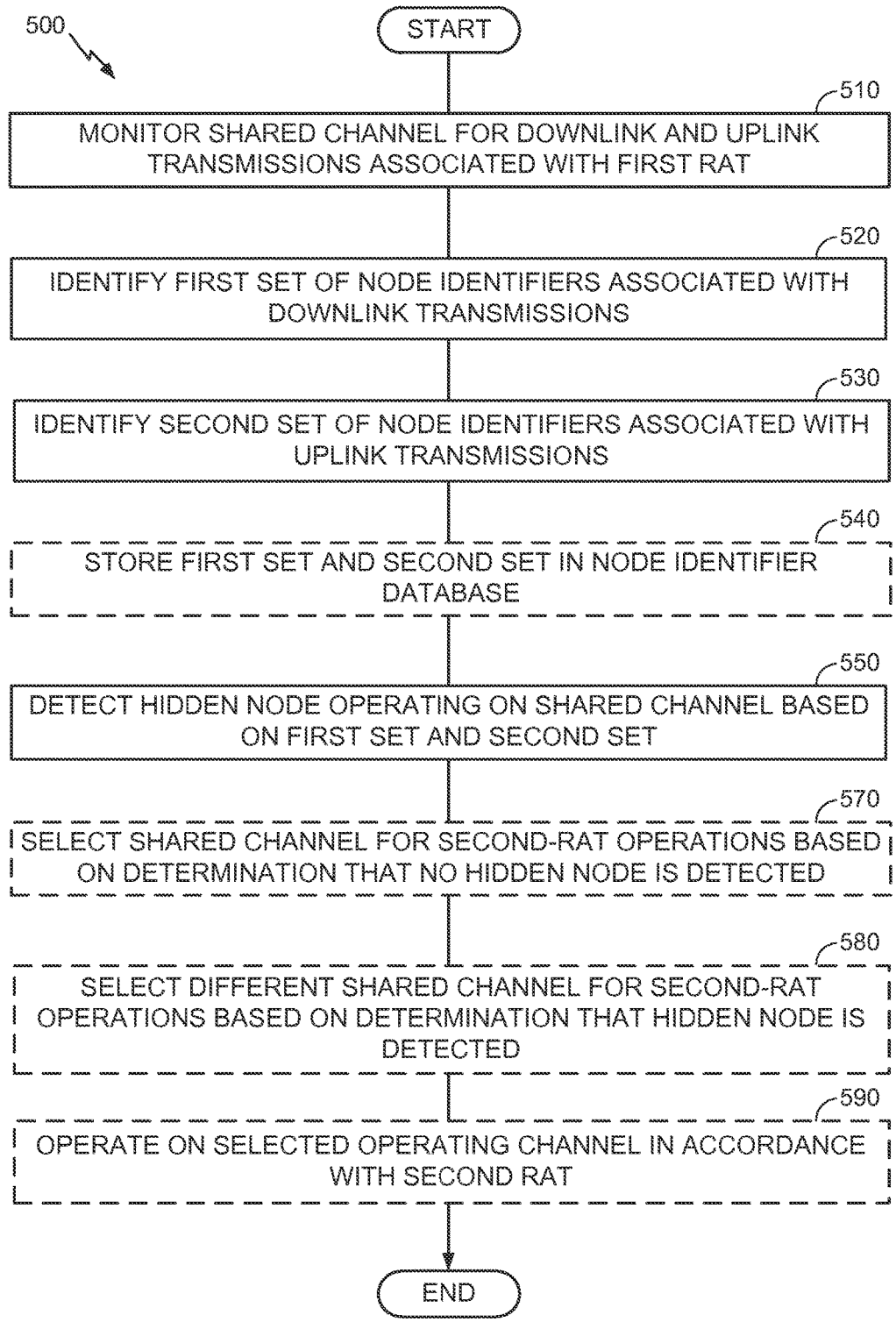
FIG. 5 is a flow diagram illustrating an example method of managing communication in accordance with a second RAT on a channel shared with a first RAT.

FIG. 5 is a flow diagram illustrating an example communications method 500 in accordance with the techniques described above. The method 500 may be performed, for example, by an access point (e.g., the access point 110 illustrated in FIG. 1).

As shown, the access point may monitor a shared channel for downlink transmissions associated with a first RAT and uplink transmissions associated with the first RAT (block 510). The monitoring may be performed, for example, by a transceiver such as the first-RAT transceiver 140 or the like. The access point may identify a first set of NIDs associated with the downlink transmissions on the shared channel (block 520) and identify a second set of NIDs associated with the uplink transmissions on the shared channel (block 530). The determining may be performed, for example, by a node identification analyzer such as the node identification analyzer 144 or the like. The access point may optionally store the NIDs such that each of the stored NIDs is associated with at least one channel of the plurality of shared channels and each of the stored NIDs belongs to the first set of NIDs, the second set of NIDs, or both (optional block 540). The storing may be performed, for example, by a memory component such as the memory component 118 or the like. The access point may detect a hidden node operating on the shared channel based on the first set of NIDs and the second set of NIDs (block 550). The detecting may be performed, for example, by a hidden node detector such as the hidden node detector 146 or the like. In one possible implementation, the hidden node is detected by comparing the second set of NIDs to the first set of NIDs, and identifying a hidden node operating on the shared channel based on a determination that at least one NID from the second set of NIDs is not included in the first set of NIDs.

As discussed above, the access point may optionally select the shared channel as an operating channel for operation in accordance with the second RAT based on a determination by the hidden node detector that there is no hidden node operating on the shared channel (optional block 570). The channel selection may be performed, for example, by an operating channel selector such as the operating channel selector 148 or the like. The access point may optionally select a different shared channel as an operating channel for operation in accordance with a second RAT based on a determination by the hidden node detector that a detected hidden node is operating on the shared channel (optional block 580). The channel selection may be performed, for example, by an operating channel selector such as the operating channel selector 148 or the like. The access point may optionally operate on the selected operating channel in accordance with the second RAT (optional block 590). The operating may be performed, for example, by a transceiver such as the second-RAT transceiver 142 or the like.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 6:
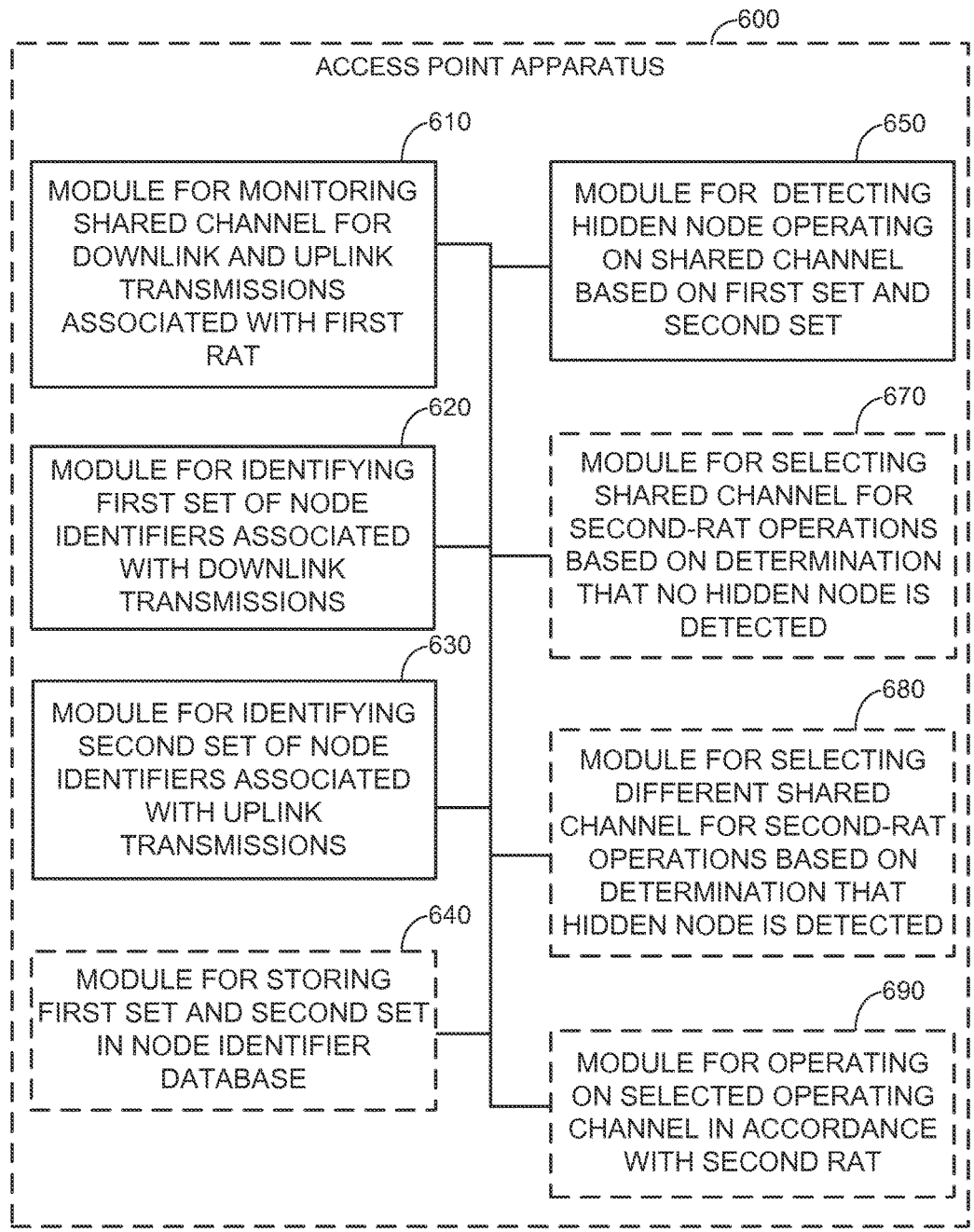
FIG. 6 illustrates an example access point apparatus represented as a series of interrelated functional modules.

FIG. 6 provides an alternative illustration of an apparatus for implementing the access point 110. In particular, FIG. 6 illustrates an example access point apparatus 600 represented as a series of interrelated functional modules. A module for monitoring a shared channel for downlink transmissions associated with a first RAT and uplink transmissions associated with the first RAT (610) may correspond at least in some aspects to, for example, a transceiver or a component thereof as discussed herein (e.g., the first-RAT transceiver 140 or the like). A module for identifying a first set of NIDs associated with the downlink transmissions on the shared channel (620) may correspond at least in some aspects to, for example, a node identification analyzer or a component thereof as discussed herein (e.g., the node identification analyzer 144 or the like). A module for identifying a second set of NIDs associated with the uplink transmissions on the shared channel (630) may correspond at least in some aspects to, for example, a node identification analyzer or a component thereof as discussed herein (e.g., the node identification analyzer 144 or the like). An optional module for storing the NIDs such that each of the stored NIDs is associated with at least one channel of the plurality of shared channels and each of the stored NIDs belongs to the first set of NIDs, the second set of NIDs, or both (640) may correspond at least in some aspects to, for example, a memory component or a component thereof as discussed herein (e.g., the memory component 118 or the like). A module for detecting a hidden node operating on the shared channel based on the first set of NIDs and the second set of NIDs (650) may correspond at least in some aspects to, for example, a hidden node detector or a component thereof as discussed herein (e.g., the hidden node detector 146 or the like). An optional module for selecting the shared channel as an operating channel for operation in accordance with a second RAT based on a determination by the hidden node detector that there is no hidden node operating on the shared channel (670) may correspond at least in some aspects to, for example, a operating channel selector or a component thereof as discussed herein (e.g., the operating channel selector 148 or the like). An optional module for selecting a different shared channel as an operating channel for operation in accordance with the second RAT based on a determination by the hidden node detector that a detected hidden node is operating on the shared channel (680) may correspond at least in some aspects to, for example, an operating channel selector or a component thereof as discussed herein (e.g., the operating channel selector 148 or the like). An optional module for operating on the selected operating channel in accordance with the second RAT (690) may correspond at least in some aspects to, for example, a transceiver or a component thereof as discussed herein (e.g., the second-RAT transceiver 142 or the like).

The functionality of the modules in FIG. 6 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying code for causing a processor to perform processes. As an example, such a computer-readable medium may include code for monitoring a shared channel for downlink transmissions associated with a first RAT and uplink transmissions associated with the first RAT, code for identifying a first set of NIDs associated with the downlink transmissions on the shared channel and a second set of NIDs associated with the uplink transmissions on the shared channel, and code for detecting a hidden node operating on the shared channel based on the first set of NIDs and the second set of NIDs.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus for managing communication in accordance with a second Radio Access Technology (RAT) on a channel shared with a first RAT, comprising:
a first transceiver configured to monitor the shared channel for downlink transmissions associated with the first RAT and uplink transmissions associated with the first RAT;
a node identification analyzer configured to identify a first set of node identifiers (NIDs) associated with the downlink transmissions on the shared channel and a second set of NIDs associated with the uplink transmissions on the shared channel;
a hidden node detector configured to:
detect a hidden node operating on the shared channel based on the first set of NIDs and the second set of NIDs;
compare the second set of NIDs to the first set of NIDs; and
identify the hidden node operating on the shared channel based on a determination that at least one NID from the second set of NIDs is not included in the first set of NIDs;
an operating channel selector configured to select the shared channel as an operating channel for operation in accordance with the second RAT based on a determination by the hidden node detector that there is no hidden node operating on the shared channel; and
a second transceiver configured to operate on the selected operating channel in accordance with the second RAT.

2. The apparatus of claim 1, wherein:
the operating channel selector is further configured to select a different shared channel as an operating channel for operation in accordance with the second RAT based on a determination by the hidden node detector that a detected hidden node is operating on the shared channel; and
the second transceiver is further configured to operate on the selected operating channel in accordance with the second RAT.

3. The apparatus of claim 1, wherein:
the first RAT is a WiFi RAT;
the identified NIDs comprise one or more of basic service set identification numbers (BSSIDs) or media access control addresses (MAC-IDs) obtained from one or more of beacon signals included in the downlink transmissions, clear-to-send (CTS) messages included in the uplink transmissions, or acknowledgement messages (ACK) included in the uplink transmissions;
the second RAT is a long-term evolution (LTE) RAT; and
the shared channel is in the Unlicensed National Information Infrastructure (U-NII) radio band.

4. An apparatus for managing communication in accordance with a second Radio Access Technology (RAT) on a channel shared with a first RAT, comprising:
a transceiver configured to monitor the shared channel for downlink transmissions associated with the first RAT and uplink transmissions associated with the first RAT;
a node identification analyzer configured to identify a first set of node identifiers (NIDs) associated with the downlink transmissions on the shared channel and a second set of NIDs associated with the uplink transmissions on the shared channel;
a hidden node detector configured to detect a hidden node operating on the shared channel based on the first set of NIDs and the second set of NIDs; and
a node identification database configured to store the NIDs identified by the node identification analyzer, wherein the node identification database associates each of the stored NIDs with at least one channel of the plurality of shared channels and identifies each NID as belonging to the first set of NIDs, the second set of NIDs, or both.

5. The apparatus of claim 4, wherein the hidden node detector is further configured to:
compare the second set of NIDs stored in the node identification database to the first set of NIDs stored in the node identification database;
determine that at least one NID from the second set of NIDs is not included in the first set of NIDs; and
detect the hidden node by identifying the at least one channel of the plurality of shared channels associated with the at least one NID from the second set of NIDs that is not included in the first set of NIDs.

6. The apparatus of claim 5, further comprising:
an operating channel selector configured to:
assign a priority metric to each of the plurality of shared channels; and
select a highest-priority channel from the plurality of shared channels for operation in accordance with the second RAT; and
a second transceiver configured to operate on the selected operating channel in accordance with the second RAT.

7. The apparatus of claim 6, wherein the operating channel selector is configured to assign a lower priority metric to a given channel of the plurality of shared channels if the hidden node detector detects a hidden node operating on the given channel.

8. The apparatus of claim 6, wherein:
the transceiver is further configured to measure signal strength of the uplink transmissions on each of the plurality of shared channels; and
the operating channel selector is configured to assign a lower priority metric to a given channel of the plurality of shared channels if the measured signal strength on the given channel exceeds a signal strength threshold.

9. A method for managing communication in accordance with a second Radio Access Technology (RAT) on a channel shared with a first RAT, comprising:
monitoring the shared channel for downlink transmissions associated with the first RAT and uplink transmissions associated with the first RAT;
identifying a first set of node identifiers (NIDs) associated with the downlink transmissions on the shared channel and a second set of NIDs associated with the uplink transmissions on the shared channel;
detecting a hidden node operating on the shared channel based on the first set of NIDs and the second set of NIDs;
comparing the second set of NIDs to the first set of NIDs;
identifying the hidden node operating on the shared channel based on a determination that at least one NID from the second set of NIDs is not included in the first set of NIDs;
selecting the shared channel as an operating channel for operation in accordance with the second RAT based on a determination that there is no hidden node operating on the shared channel; and
operating on the selected operating channel in accordance with the second RAT.

10. The method of claim 9, wherein:
selecting a different shared channel as an operating channel for operation in accordance with the second RAT based on a determination by the hidden node detector that a detected hidden node is operating on the shared channel; and operating on the selected operating channel in accordance with the second RAT.

11. The method of claim 9, wherein:
the first RAT is a WiFi RAT;
the identified NIDs comprise one or more of basic service set identification numbers (BSSIDs) or media access control addresses (MAC-IDs) obtained from one or more of beacon signals included in the downlink transmissions, clear-to-send (CTS) messages included in the uplink transmissions, or acknowledgement messages (ACK) included in the uplink transmissions;
the second RAT is a long-term evolution (LTE) RAT; and
the shared channel is in the Unlicensed National Information Infrastructure (U-NII) radio band.

12. A method for managing communication in accordance with a second Radio Access Technology (RAT) on a channel shared with a first RAT, comprising:
monitoring the shared channel for downlink transmissions associated with the first RAT and uplink transmissions associated with the first RAT;
identifying a first set of node identifiers (NIDs) associated with the downlink transmissions on the shared channel and a second set of NIDs associated with the uplink transmissions on the shared channel;
detecting a hidden node operating on the shared channel based on the first set of NIDs and the second set of NIDs; and
storing the NIDs such that each of the stored NIDs is associated with at least one channel of the plurality of shared channels and each of the stored NIDs belongs to the first set of NIDs, the second set of NIDs, or both.

13. The method of claim 12, wherein detecting the hidden node comprises:
comparing the second set of NIDs to the first set of NIDs;
determining that at least one NID from the second set of NIDs is not included in the first set of NIDs; and
detecting the hidden node by identifying the at least one channel of the plurality of shared channels associated with the at least one NID from the second set of NIDs that is not included in the first set of NIDs.

14. The method of claim 13, further comprising:
selecting an operating channel by:
assigning a priority metric to each of the plurality of shared channels; and
selecting a highest-priority channel from the plurality of shared channels for operation in accordance with the second RAT; and
operating on the selected operating channel in accordance with the second RAT.

15. The method of claim 14, wherein assigning the priority metric comprises assigning a lower priority metric to a given channel of the plurality of shared channels if a hidden node operating on the given channel is detected.

16. The method of claim 14, wherein:
monitoring the shared channel for uplink transmissions further comprises measuring signal strength of the uplink transmissions on each of the plurality of shared channels; and
assigning a priority metric comprises assigning a lower priority metric to a given channel of the plurality of shared channels if the measured signal strength on the given channel exceeds a signal strength threshold.

17. An apparatus for managing communication in accordance with a second Radio Access Technology (RAT) on a channel shared with a first RAT, comprising:
means for monitoring the shared channel for downlink transmissions associated with the first RAT and uplink transmissions associated with the first RAT;
means for identifying a first set of node identifiers (NIDs) associated with the downlink transmissions on the shared channel and a second set of NIDs associated with the uplink transmissions on the shared channel;
means for detecting a hidden node operating on the shared channel based on the first set of NIDs and the second set of NIDs;
means for comparing the second set of NIDs to the first set of NIDs; and
means for identifying the hidden node operating on the shared channel based on a determination that at least one NID from the second set of NIDs is not included in the first set of NIDs;
means for selecting the shared channel as an operating channel for operation in accordance with the second RAT based on a determination that there is no hidden node operating on the shared channel; and
means for operating on the selected operating channel in accordance with the second RAT.

18. The apparatus of claim 17, further comprising:
means for selecting a different shared channel as an operating channel for operation in accordance with the second RAT based on a determination that a detected hidden node is operating on the shared channel; and
means for operating on the selected operating channel in accordance with the second RAT.

19. The apparatus of claim 17, wherein:
the first RAT is a WiFi RAT;
the identified NIDs comprise one or more of basic service set identification numbers (BSSIDs) or media access control addresses (MAC-IDs) obtained from one or more of beacon signals included in the downlink transmissions, clear-to-send (CTS) messages included in the uplink transmissions, or acknowledgement messages (ACK) included in the uplink transmissions;
the second RAT is a long-term evolution (LTE) RAT; and
the shared channel is in the Unlicensed National Information Infrastructure (U-NII) radio band.

20. A non-transitory computer-readable medium comprising code for causing a processor to perform processes for managing communication in accordance with a second Radio Access Technology (RAT) on a channel shared with a first RAT, comprising:
code for monitoring the shared channel for downlink transmissions associated with the first RAT and uplink transmissions associated with the first RAT;
code for identifying a first set of node identifiers (NIDs) associated with the downlink transmissions on the shared channel and a second set of NIDs associated with the uplink transmissions on the shared channel;
code for detecting a hidden node operating on the shared channel based on the first set of NIDs and the second set of NIDs;
code for comparing the second set of NIDs to the first set of NIDs; and
code for identifying the hidden node operating on the shared channel based on a determination that at least one NID from the second set of NIDs is not included in the first set of NIDs;
code for selecting the shared channel as an operating channel for operation in accordance with the second RAT based on a determination that there is no hidden node operating on the shared channel; and code for operating on the selected operating channel in accordance with the second RAT.

21. The apparatus of claim 20, further comprising:

code for selecting a different shared channel as an operating channel for operation in accordance with the second RAT based on a determination by the hidden node detector that a detected hidden node is operating on the shared channel; and code for operating on the selected operating channel in accordance with the second RAT.

22. The apparatus of claim 20, wherein:

the first RAT is a WiFi RAT;

the identified NIDs comprise one or more of basic service set identification numbers (BSSIDs) or media access control addresses (MAC-IDs) obtained from one or more of beacon signals included in the downlink transmissions, clear-to-send (CTS) messages included in the uplink transmissions, or acknowledgement messages (ACK) included in the uplink transmissions;

the second RAT is a long-term evolution (LTE) RAT; and the shared channel is in the Unlicensed National Information Infrastructure (U-NII) radio band.

23. An apparatus for managing communication in accordance with a second Radio Access Technology (RAT) on a channel shared with a first RAT, comprising:

means for monitoring the shared channel for downlink transmissions associated with the first RAT and uplink transmissions associated with the first RAT;

means for identifying a first set of node identifiers (NIDs) associated with the downlink transmissions on the shared channel and a second set of NIDs associated with the uplink transmissions on the shared channel;

means for detecting a hidden node operating on the shared channel based on the first set of NIDs and the second set of NIDs; and means for storing the NIDs such that each of the stored NIDs is associated with at least one channel of the plurality of shared channels and each of the stored NIDs belongs to the first set of NIDs, the second set of NIDs, or both.

24. The apparatus of claim 23, wherein detecting the hidden node comprises:

means for comparing the second set of NIDs to the first set of NIDs;

means for determining that at least one NID from the second set of NIDs is not included in the first set of NIDs; and means for detecting the hidden node by identifying the at least one channel of the plurality of shared channels associated with the at least one NID from the second set of NIDs that is not included in the first set of NIDs.

25. The apparatus of claim 24, further comprising:

means for selecting an operating channel comprising:

means for assigning a priority metric to each of the plurality of shared channels; and means for selecting a highest-priority channel from the plurality of shared channels for operation in accordance with the second RAT; and means for operating on the selected operating channel in accordance with the second RAT.

26. The apparatus of claim 25, wherein means for assigning the priority metric comprises means for assigning a lower priority metric to a given channel of the plurality of shared channels if a hidden node operating on the given channel is detected.

27. The apparatus of claim 25, wherein:

means for monitoring the shared channel for uplink transmissions further comprises means for measuring signal strength of the uplink transmissions on each of the plurality of shared channels; and means for assigning a priority metric comprises means for assigning a lower priority metric to a given channel of the plurality of shared channels if the measured signal strength on the given channel exceeds a signal strength threshold.

28. A non-transitory computer-readable medium comprising code for causing a processor to perform processes for managing communication in accordance with a second Radio Access Technology (RAT) on a channel shared with a first RAT, comprising:

code for monitoring the shared channel for downlink transmissions associated with the first RAT and uplink transmissions associated with the first RAT;

code for identifying a first set of node identifiers (NIDs) associated with the downlink transmissions on the shared channel and a second set of NIDs associated with the uplink transmissions on the shared channel;

code for detecting a hidden node operating on the shared channel based on the first set of NIDs and the second set of NIDs; and code for storing the NIDs such that each of the stored NIDs is associated with at least one channel of the plurality of shared channels and each of the stored NIDs belongs to the first set of NIDs, the second set of NIDs, or both.

29. The apparatus of claim 28, wherein detecting the hidden node comprises:

code for comparing the second set of NIDs to the first set of NIDs;

code for determining that at least one NID from the second set of NIDs is not included in the first set of NIDs; and code for detecting the hidden node by identifying the at least one channel of the plurality of shared channels associated with the at least one NID from the second set of NIDs that is not included in the first set of NIDs.

30. The apparatus of claim 29, further comprising:

code for selecting an operating channel comprising:

code for assigning a priority metric to each of the plurality of shared channels; and code for selecting a highest-priority channel from the plurality of shared channels for operation in accordance with the second RAT; and code for operating on the selected operating channel in accordance with the second RAT.

31. The apparatus of claim 30, wherein code for assigning the priority metric comprises code for assigning a lower priority metric to a given channel of the plurality of shared channels if a hidden node operating on the given channel is detected.

32. The apparatus of claim 30, wherein:

code for monitoring the shared channel for uplink transmissions further comprises code for measuring signal strength of the uplink transmissions on each of the plurality of shared channels; and code for assigning a priority metric comprises code for assigning a lower priority metric to a given channel of the plurality of shared channels if the measured signal strength on the given channel exceeds a signal strength threshold.

* * * * *